US012764252B2

(12) United States Patent
Karagioules et al.

(10) Patent No.: US 12,764,252 B2
(45) Date of Patent: Oct. 13, 2026

(54) MEASURING AND USING INTERACTIVITY IN VIDEO CONFERENCING

(71) Applicants: AT&T Intellectual Property I, L.P., Atlanta, GA (US); Georgia Tech Research Corporation, Atlanta, GA (US)

(72) Inventors: Theodore Karagioules, Jersey City, NJ (US); Emir Halepovic, Somerset, NJ (US); Mostafa Ammar, Smyrna, GA (US); Ellen Zegura, Decatur, GA (US); Jia He, Atlanta, GA (US)

(73) Assignees: AT&T Intellectual Property I, L.P., Atlanta, GA (US); Georgia Tech Research Corporation, Atlanta, GA (US)

( * ) Notice: Subject to any disclaimer, the term of this patent is extended or adjusted under 35 U.S.C. 154(b) by 106 days.

(21) Appl. No.: 18/652,988

(22) Filed: May 2, 2024

(65) Prior Publication Data

US 2025/0343876 A1 Nov. 6, 2025

(51) Int. Cl.
*H04N 7/15* (2006.01)

(52) U.S. Cl.
CPC .................................... *H04N 7/15* (2013.01)

(58) Field of Classification Search
None
See application file for complete search history.

(56) References Cited

U.S. PATENT DOCUMENTS

| | | | | |
|---|---|---|---|---|
| 2005/0265534 | A1* | 12/2005 | White | H04L 65/1094 709/204 |
| 2008/0320082 | A1* | 12/2008 | Kuhlke | H04L 12/1822 709/205 |
| 2015/0193718 | A1* | 7/2015 | Shaburov | G06Q 10/06393 705/7.39 |
| 2023/0023431 | A1* | 1/2023 | Christensen | G06V 10/751 |
| 2023/0386642 | A1* | 11/2023 | Foufa | G10L 25/63 |
| 2024/0129434 | A1* | 4/2024 | Silverstein | H04N 7/152 |

* cited by examiner

*Primary Examiner* — Duc Nguyen
*Assistant Examiner* — Assad Mohammed
(74) *Attorney, Agent, or Firm* — Guntin & Gust, PLC; Erik Boyd

(57) ABSTRACT

Measuring and using interactivity in video conferencing can include identifying two or more client devices to be added to the video conference and establishing the video conference with the two client devices. Medica content can be generated, exchanged, and received via a video conferencing service, and quality of experience metric data associated with the video conference can be obtained. The quality of experience metric data can define interactivity associated with the video conference based on observable behavior associated with the video conference. Based on the quality of experience metric data, a projected quality of experience can be compared to a defined quality of experience measure, and if the projected quality of experience does not satisfy the defined quality of experience measure, a change to improve the projected quality of experience can be determined and a command can be generated and sent to cause a recipient to make the change.

20 Claims, 6 Drawing Sheets

MEASURING AND USING INTERACTIVITY IN VIDEO CONFERENCING

STATEMENT REGARDING FEDERALLY SPONSORED RESEARCH OR DEVELOPMENT

This invention was made with government support under 1909040 awarded by the National Science Foundation. The government has certain rights in the invention.

BACKGROUND

In the video conferencing arts, it is important for Internet service providers ("ISPs") to understand the user experience. To do so, existing methods may focus on quality of service ("QoS") metrics that may be obtained from various network entities and may indicate connection speed, latency, jitter, or the like. While QoS metrics may reflect network conditions, quality, and provisioning, such metrics may not represent the actual user experience.

SUMMARY

The present disclosure is directed to measuring and using interactivity in video conferencing. As used herein, interactivity can refer to how clients interact with each other during a video conference (e.g., via their respective client devices) and therefore can refer to observable behavior of clients during a video conference (e.g., if clients repeat themselves verbally during a video conference, delays in responding to questions, an amount of time that is silent during a video conference, or the like). These and/or other interactivity metrics can be determined based on analyzing the streaming video conference content at a conferencing service and/or the client devices.

In practice, a user, client, or other entity can request a video conference. For example, a client can create a request (e.g., via a portal, an application programming interface ("API"), or the like) for a video conference from a video conferencing service, start a video conference via interactions with the video conferencing service, or otherwise start or request the video conference. The video conferencing service can be configured to initiate the video conference (e.g., set up a virtual room for the video conference, send invites to the video conference, or the like) and join two or more client devices to the video conference. In some embodiments, the video conferencing service can trigger setup of the conference by communicating with the signaling server, and the signaling server can connect the client devices to the video conference. It should be understood that this example embodiment is illustrative, and therefore should not be construed as being limiting in any way.

The video conferencing service can be configured to host the video conference and to send and receive media content (e.g., streams of video and/or audio content) to the client devices involved in the video conference. The video conferencing service or a component thereof such as the conferencing optimization module can analyze the video conference (e.g., by analyzing the video and audio being sent and/or received by the video conferencing service) to track interactivity associated with the video conference. Based on the observed behavior of the clients and/or client devices (e.g., turnaround time, silence time ratio, overlap time ratio, overlap rate, useful conversation time ratio, repeat rate, turn-taking freedom, and/or other metrics), the conferencing optimization module can determine an actual, projected, and/or perceived quality of experience associated with the video conference without accessing or determining any network conditions (e.g., latency, jitter, downlink and/or uplink speed, bandwidth, combinations thereof, or the like).

In some embodiments, the client devices also can be configured to capture the quality of experience metrics (e.g., by analyzing the received and/or sent media content using the video conferencing application and determining, based on the analysis of the media content, turnaround time, silence time ratio, overlap time ratio, overlap rate, useful conversation time ratio, repeat rate, turn-taking freedom, and/or other metrics). The client devices can generate quality of experience metric data that represent these and/or other metrics and send the quality of experience metric data to the video conferencing service in addition to or instead of the video conferencing service generating the quality of experience metric data based on analysis of the video conference. It should be understood that this example embodiment is illustrative, and therefore should not be construed as being limiting in any way.

The video conferencing service can determine, based on analyzing the quality of experience metric data (received from the client devices and/or generated at the server computer), if the quality of experience associated with the video conference meets defined measures and/or expectations. For example, the video conferencing service can store or access defined quality of experience measures for the video conference and determine, based on the quality of experience metric data, if the defined quality of experience measure(s) are satisfied. For example, a turnaround time that exceeds a particular threshold (e.g., two seconds or the like) may be understood by the conferencing optimization module and/or the video conferencing service as indicating a high level of latency associated with the client devices and/or their connections to the video conferencing service, thereby indicating a relatively low quality of experience relative to defined quality of experience targets.

As such, the video conferencing service can be configured to project, estimate, or determine quality of experience associated with the video conference without directly analyzing or determining network conditions (e.g., latency, jitter, uplink or downlink speed, bandwidth, utilization, or the like) associated with the video conference and/or connections used in association with the video conference. Thus, the video conferencing service can be configured to determine quality of experience associated with the video conference based on data that can be observable by the video conferencing service and/or the client devices (e.g., the video and/or audio stream associated with the video conference) and therefore can determine the quality of experience in a more efficient and/or reliable manner than collecting and analyzing network performance data or the like. It should be understood that this example embodiment is illustrative, and therefore should not be construed as being limiting in any way.

If the video conferencing service determines that the quality of experience associated with the video conference meets or exceeds some defined measures or metrics, the video conferencing service may determine that no changes need to be made to the video conference, connections associated with the video conference, the client devices, and/or other aspects of the video conference. If the video conferencing service determines that the quality of experience targets or measures defined for the video conference are not satisfied, the video conferencing service may determine that some changes may be made to the video conference via changes to connection paths, prioritization, clients, or other aspects of the video conference to attempt to improve quality of experience or perceived quality of experience for the video conference.

In various embodiments of the concepts and technologies disclosed herein, the video conferencing service may change the video conference by adding or removing parties from the video conference; by instructing one or more of the client devices to alter encryption and/or decryption technologies used by the client devices; by instructing one or more of the client devices to alter resolution of captured video; by instructing one or more of the client devices to stop or start capturing video; by instructing one or more of the client devices to alter quality (e.g., sampling rate or the like) of captured audio; by instructing one or more of the client devices and/or the signaling server to switch paths, channels, servers, or other hardware or software associated with the video conference; by instructing one or more of the client devices to introduce delay at one or more than one client device (to reduce a disparity in delay among the two or more client devices); combinations thereof; or the like. Because other changes can be made as illustrated and described herein, it should be understood that these example embodiments are illustrative, and therefore should not be construed as being limiting in any way.

The video conferencing service can generate one or more commands that can capture instructions for making the desired changes to the video conference and/or entities associated with the video conference such as the client devices, the communication paths, or the like. The commands can include computer-executable instructions that, when executed by a recipient such as the client devices, the signaling server, or the like, can cause the client devices, the signaling server, network hardware or software, or other entities to make changes to the video conference and/or to make changes to network technologies and/or connections used for the video conference. Thus, for example, the commands can be executed by the client devices and/or the signaling server to add or change parties in the video conference; alter encryption and/or decryption technologies used in the video conference; alter resolution of captured video in the video conference; alter quality of audio captured during the video conference; switch paths, channels, servers, or other hardware associated with the video conference; change software used in association with the video conference; change priorities associated with the applications executing on the client devices; introduce delay at one or more of the client devices; combinations thereof; or the like. Because other changes can be made as illustrated and described herein, it should be understood that these example embodiments are illustrative, and therefore should not be construed as being limiting in any way.

The video conferencing service can send the commands to the client devices, the signaling server, or other devices, and/or can implement similar actions at the server computer itself (for example to modify operation of the video conferencing service, the conferencing optimization module, the selective forwarding unit, or the like) to make the commanded changes to the video conference. This analysis can continue and/or can be repeated to improve quality of experience of the video conference during the video conference itself. The video conferencing service can determine at various times if the video conference has ended. If the video conference has not ended, the video conferencing service can again obtain and analyze media content and/or can again receive and/or capture the quality of experience metric data to determine if any changes should be made. Thus, it can be appreciated that the video conferencing service can be configured to continually monitor quality of experience associated with the video conference via analyzing the quality of experience metric data and/or analyzing the media content or other streams associated with the video conference. It should be understood that this example embodiment is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include detecting, at a computer that can include a processor, a request to initiate a video conference; identifying two client devices that are to be added to the video conference; and triggering a signaling server to establish the video conference with the two client devices. The two client devices can generate, exchange, and/or receive media content with one another via a video conferencing service. The operations further can include obtaining quality of experience metric data associated with the video conference, where the quality of experience metric data can define an interactivity associated with the video conference and can be based on observable behavior associated with the video conference. The operations further can include determining, based on the quality of experience metric data, if a projected quality of experience associated with the video conference satisfies a defined quality of experience measure; and if a determination is made that the projected quality of experience associated with the video conference does not satisfy the defined quality of experience measure, determining a change to be made to the video conference to improve the projected quality of experience, generating a command that, when executed, causes a recipient to make the change, and sending the command to the recipient.

In some embodiments, the quality of experience metric data can include data representing a turnaround time, a silence time ratio, an overlap time ratio, an overlap rate, a useful conversation time ratio, a repeat rate, and turn-taking freedom associated with the video conference. A first portion of the quality of experience metric data can be generated by the computer by analyzing an audio and video stream associated with the video conference, and a second portion of the quality of experience metric data can be provided to the computer by the two client devices, where the two client devices can generate the quality of experience metric data based on analyzing the media content received by the two client devices. In some embodiments, the quality of experience metric data is generated at the computer by analyzing an audio and video stream associated with the video conference.

In some embodiments, analyzing the audio and video stream can include detecting repeated phrases, overlapping speech, and a silence time ratio using machine learning that is trained on real or simulated video conferences. In some embodiments, the quality of experience metric data can be provided to the computer by the two client devices, and the two client devices can generate the quality of experience metric data based on analyzing the media content received by the two client devices. In some embodiments, the command can cause one client device of the two client devices to introduce delay into audio and video associated with the video conference at the one client device. In some embodiments, the command can cause the two client devices to reconnect to the video conference using a different communication path.

According to another aspect of the concepts and technologies disclosed herein, a method is disclosed. The method can include detecting, at a computer that can include a processor, a request to initiate a video conference; identifying, by the processor, two client devices that are to be added to the video conference; and triggering, by the processor, a signaling server to establish the video conference with the two client devices. The two client devices can generate, exchange, and/or receive media content with one another via a video conferencing service. The method further can include obtaining, by the processor, quality of experience metric data associated with the video conference, where the quality of experience metric data can define an interactivity associated with the video conference and can be based on observable behavior associated with the video conference. The method further can include determining, by the processor and based on the quality of experience metric data, if a projected quality of experience associated with the video conference satisfies a defined quality of experience measure; and if a determination is made that the projected quality of experience associated with the video conference does not satisfy the defined quality of experience measure, determining, by the processor, a change to be made to the video conference to improve the projected quality of experience, generating, by the processor, a command that, when executed, causes a recipient to make the change, and sending, by the processor, the command to the recipient.

In some embodiments, the quality of experience metric data can include data representing a turnaround time, a silence time ratio, an overlap time ratio, an overlap rate, a useful conversation time ratio, a repeat rate, and turn-taking freedom associated with the video conference. A first portion of the quality of experience metric data can be generated by the computer by analyzing an audio and video stream associated with the video conference, and a second portion of the quality of experience metric data can be provided to the computer by the two client devices, where the two client devices can generate the quality of experience metric data based on analyzing the media content received by the two client devices. In some embodiments, the quality of experience metric data is generated at the computer by analyzing an audio and video stream associated with the video conference.

In some embodiments, analyzing the audio and video stream can include detecting repeated phrases, overlapping speech, and a silence time ratio using machine learning that is trained on simulated video conferences. In some embodiments, the quality of experience metric data can be provided to the computer by the two client devices, and the two client devices can generate the quality of experience metric data based on analyzing the media content received by the two client devices. In some embodiments, the command can cause one client device of the two client devices to introduce delay into audio and video associated with the video conference at the one client device. In some embodiments, the command can cause the two client devices to reconnect to the video conference using a different communication path.

According to yet another aspect of the concepts and technologies disclosed herein, a computer storage medium is disclosed. The computer storage medium can store computer-executable instructions that, when executed by a processor, cause the processor to perform operations. The operations can include detecting, at a computer that can include a processor, a request to initiate a video conference; identifying two client devices that are to be added to the video conference; and triggering a signaling server to establish the video conference with the two client devices. The two client devices can generate, exchange, and/or receive media content with one another via a video conferencing service. The operations further can include obtaining quality of experience metric data associated with the video conference, where the quality of experience metric data can define an interactivity associated with the video conference and can be based on observable behavior associated with the video conference. The operations further can include determining, based on the quality of experience metric data, if a projected quality of experience associated with the video conference satisfies a defined quality of experience measure; and if a determination is made that the projected quality of experience associated with the video conference does not satisfy the defined quality of experience measure, determining a change to be made to the video conference to improve the projected quality of experience, generating a command that, when executed, causes a recipient to make the change, and sending the command to the recipient.

In some embodiments, the quality of experience metric data can include data representing a turnaround time, a silence time ratio, an overlap time ratio, an overlap rate, a useful conversation time ratio, a repeat rate, and turn-taking freedom associated with the video conference. A first portion of the quality of experience metric data can be generated by the computer by analyzing an audio and video stream associated with the video conference, and a second portion of the quality of experience metric data can be provided to the computer by the two client devices, where the two client devices can generate the quality of experience metric data based on analyzing the media content received by the two client devices. In some embodiments, the quality of experience metric data is generated at the computer by analyzing an audio and video stream associated with the video conference.

In some embodiments, analyzing the audio and video stream can include detecting repeated phrases, overlapping speech, and a silence time ratio using machine learning that is trained on simulated video conferences. In some embodiments, the quality of experience metric data can be provided to the computer by the two client devices, and the two client devices can generate the quality of experience metric data based on analyzing the media content received by the two client devices. In some embodiments, the command can cause one client device of the two client devices to introduce delay into audio and video associated with the video conference at the one client device. In some embodiments, the command can cause the two client devices to reconnect to the video conference using a different communication path.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
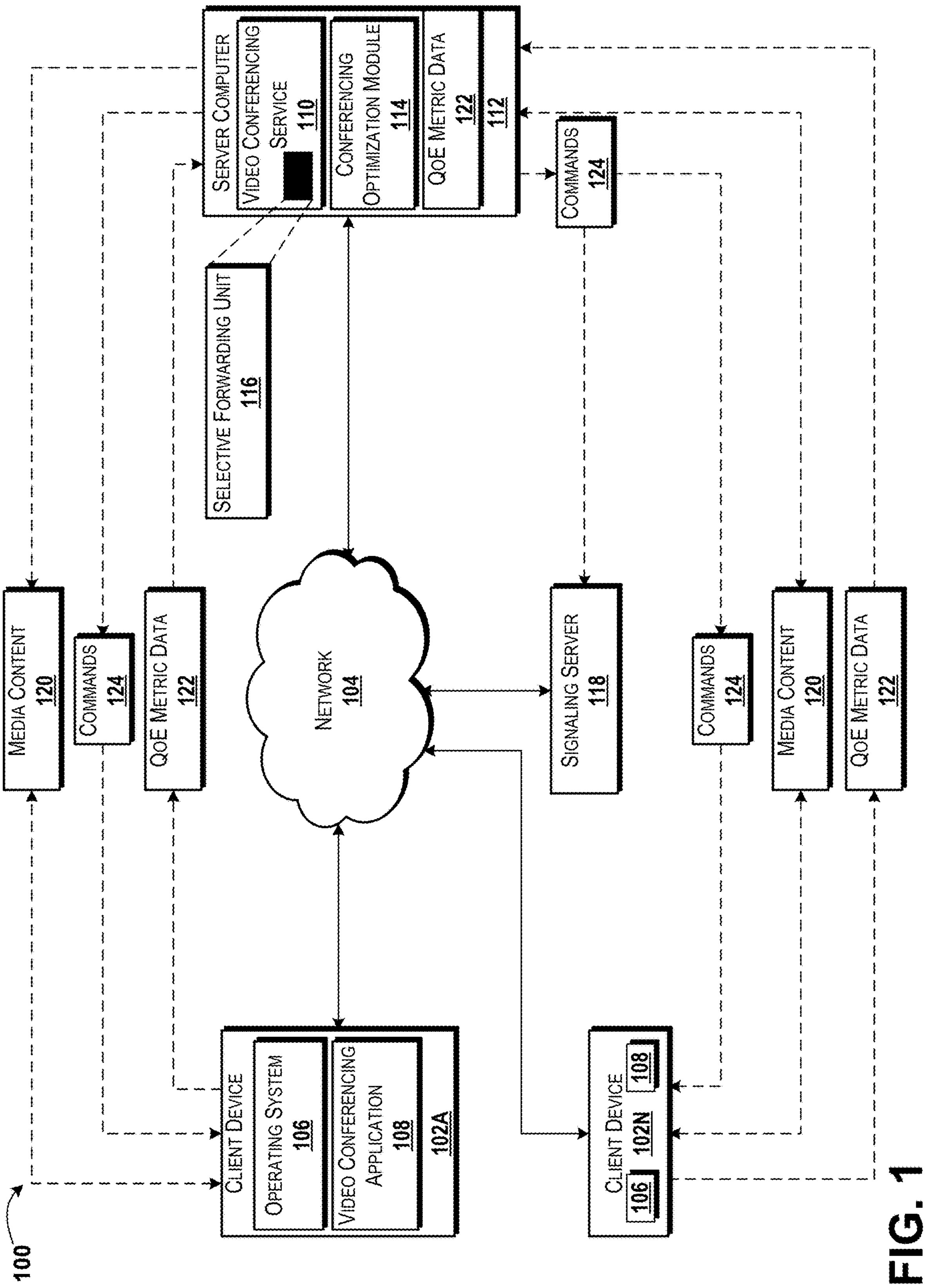
FIG. 1 is a system diagram illustrating an illustrative operating environment for various embodiments of the concepts and technologies described herein.

The following detailed description is directed to measuring and using interactivity in video conferencing. A client device can request a video conference from a video conferencing service, e.g., via a portal, API, or the like. The video conferencing service can be configured to initiate the video conference and join two or more client devices to the video conference, or to trigger setup of the conference by communicating with a signaling server, where the signaling server can connect the client devices to the video conference. The video conferencing service can be configured to host the video conference and to send and receive media content (e.g., streams of video and/or audio content) to the client devices involved in the video conference.

The video conferencing service or a component thereof such as the conferencing optimization module can analyze the video conference (e.g., by analyzing the video and audio being sent and/or received by the video conferencing service) to track interactivity associated with the video conference. This interactivity can include observable/observed behavior of the clients and/or client devices (e.g., turnaround time, silence time ratio, overlap time ratio, overlap rate, useful conversation time ratio, repeat rate, turn-taking freedom, and/or other metrics), which can be determined from the media content and/or the video stream associated with the video conference. Additionally, or alternatively, in some embodiments the optimization module can be configured to measure network conditions and to use those measurements to estimate quality of experience for the video conference. Based on these and/or other interactivity metrics, the conferencing optimization module can determine an actual, projected, and/or perceived quality of experience associated with the video conference without accessing or determining any network conditions (e.g., latency, jitter, downlink and/or uplink speed, bandwidth, combinations thereof, or the like).

In some embodiments, the client devices also can be configured to capture the quality of experience metrics (e.g., by analyzing the received and/or sent media content using the video conferencing application and determining, based on the analysis of the media content, turnaround time, silence time ratio, overlap time ratio, overlap rate, useful conversation time ratio, repeat rate, turn-taking freedom, and/or other metrics). The client devices can generate quality of experience metric data that represent these and/or other metrics and send the quality of experience metric data to the video conferencing service in addition to or instead of the video conferencing service generating the quality of experience metric data based on analysis of the video conference. It should be understood that this example embodiment is illustrative, and therefore should not be construed as being limiting in any way.

The video conferencing service can determine, based on analyzing the quality of experience metric data (received from the client devices and/or generated at the server computer), if the quality of experience associated with the video conference meets defined measures and/or expectations. For example, the video conferencing service can store or access defined quality of experience measures for the video conference and determine, based on the quality of experience metric data, if the defined quality of experience measure(s) are satisfied. For example, a turnaround time that exceeds a particular threshold (e.g., two seconds or the like) may be understood by the conferencing optimization module and/or the video conferencing service as indicating a high level of latency associated with the client devices and/or their connections to the video conferencing service, thereby indicating a relatively low quality of experience relative to defined quality of experience targets.

As such, the video conferencing service can be configured to project, estimate, or determine quality of experience associated with the video conference without directly analyzing or determining network conditions (e.g., latency, jitter, uplink or downlink speed, bandwidth, utilization, or the like) associated with the video conference and/or connections used in association with the video conference. Thus, the video conferencing service can be configured to determine quality of experience associated with the video conference based on data that can be observable by the video conferencing service and/or the client devices (e.g., the video and/or audio stream associated with the video conference) and therefore can determine the quality of experience in a more efficient and/or reliable manner than collecting and analyzing network performance data or the like. It should be understood that this example embodiment is illustrative, and therefore should not be construed as being limiting in any way.

If the video conferencing service determines that the quality of experience associated with the video conference meets or exceeds some defined measures or metrics, the video conferencing service may determine that no changes need to be made to the video conference, connections associated with the video conference, the client devices, and/or other aspects of the video conference. If the video conferencing service determines that the quality of experience targets or measures defined for the video conference are not satisfied, the video conferencing service may determine that some changes may be made to the video conference via changes to connection paths, prioritization, clients, or other aspects of the video conference to attempt to improve quality of experience or perceived quality of experience for the video conference.

In various embodiments of the concepts and technologies disclosed herein, the video conferencing service may change the video conference by adding or removing parties from the video conference; by instructing one or more of the client devices to alter encryption and/or decryption technologies used by the client devices; by instructing one or more of the client devices to alter resolution of captured video; by instructing one or more of the client devices to alter quality (e.g., sampling rate or the like) of captured audio; by instructing one or more of the client devices and/or the signaling server to switch paths, channels, servers, or other hardware or software associated with the video conference; to introduce delay at one or more than one client device (to reduce a disparity in delay among the two or more client devices); combinations thereof; or the like. Because other changes can be made as illustrated and described herein, it should be understood that these example embodiments are illustrative, and therefore should not be construed as being limiting in any way.

The video conferencing service can generate one or more commands that can capture instructions for making the desired changes to the video conference and/or entities associated with the video conference such as the client devices, the communication paths, or the like. The commands can include computer-executable instructions that, when executed by a recipient such as the client devices, the signaling server, or the like, can cause the client devices, the signaling server, network hardware or software, or other entities to make changes to the video conference and/or to make changes to network technologies and/or connections used for the video conference. Thus, for example, the commands can be executed by the client devices and/or the signaling server to add or change parties in the video conference; alter encryption and/or decryption technologies used in the video conference; alter resolution of captured video in the video conference; alter quality of audio captured during the video conference; switch paths, channels, servers, or other hardware associated with the video conference; change software used in association with the video conference; change priorities associated with the applications executing on the client devices; introduce delay at one or more of the client devices; combinations thereof; or the like. Because other changes can be made as illustrated and described herein, it should be understood that these example embodiments are illustrative, and therefore should not be construed as being limiting in any way.

The video conferencing service can send the commands to the client devices, the signaling server, or other devices, and/or can implement similar actions at the server computer itself (for example to modify operation of the video conferencing service, the conferencing optimization module, the selective forwarding unit, or the like) to make the commanded changes to the video conference. This analysis can continue and/or can be repeated to improve quality of experience of the video conference during the video conference itself. The video conferencing service can determine at various times if the video conference has ended. If the video conference has not ended, the video conferencing service can again obtain and analyze media content and/or can again receive and/or capture the quality of experience metric data to determine if any changes should be made. Thus, it can be appreciated that the video conferencing service can be configured to continually monitor quality of experience associated with the video conference via analyzing the quality of experience metric data and/or analyzing the media content or other streams associated with the video conference. It should be understood that this example embodiment is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for measuring and using interactivity in video conferencing will be described, according to an illustrative embodiment. The operating environment 100 shown in FIG. 1 can include two or more client devices 102A-N (hereinafter collectively and/or generically referred to as "client devices 102"). The client devices 102 can operate in communication with and/or as part of a communications network ("network") 104, though this is not necessarily the case in all embodiments.

According to various embodiments, the functionality of the client device 102 may be provided by one or more server computers, desktop computers, mobile telephones, laptop computers, set-top boxes, other computing systems, and the like. It should be understood that the functionality of the client device 102 may be provided by a single device, by two or more similar devices, and/or by two or more dissimilar devices. For purposes of describing the concepts and technologies disclosed herein, the client device 102 is described herein as a personal computer. It should be understood that this embodiment is illustrative, and should not be construed as being limiting in any way.

The client devices 102 can execute an operating system 106 and one or more application programs such as, for example, a video conferencing application 108. The operating system 106 can include a computer program that can control the operation of the client devices 102. The video conferencing application 108 can include an executable program that can be configured to execute on top of the operating system 106 to provide various functions as illustrated and described herein. The functionality of the video conferencing application 108 will be described in additional detail after introducing the other components of the operating environment 100.

As shown in FIG. 1, the operating environment 100 also can include a video conferencing service 110, which can be hosted and/or executed by the server computer 112. According to various embodiments of the concepts and technologies disclosed herein, the functionality of the server computer 112 may be provided by one or more server computers, application servers, web servers, data processing resources, gateway devices, routers, other computing systems, and the like. It should be understood that the functionality of the server computer 112 may be provided by a single device, by two or more similar devices, and/or by two or more dissimilar devices. For purposes of describing the concepts and technologies disclosed herein, the server computer 112 is described herein as an application server. It should be understood that this embodiment is illustrative, and should not be construed as being limiting in any way.

According to various embodiments of the concepts and technologies disclosed herein, the server computer 112 also can host and/or execute a conferencing optimization module 114 and a selective forwarding unit 116. The conferencing optimization module 114 and the selective forwarding unit 116 can be components or modules included in the video conferencing service 110, in some embodiments, and/or can be provided by standalone applications and/or modules. Thus, while the video conferencing service 110, the conferencing optimization module 114, and the selective forwarding unit 116 are illustrated as components of the server computer 112, it should be understood that each of these components, or combinations thereof, may be embodied as or in standalone devices or components thereof operating as part of or in communication with the network 104 and/or the server computer 112. As such, the illustrated embodiment should be understood as being illustrative of only some contemplated embodiments and should not be construed as being limiting in any way.

The operating environment 100 also can include a signaling server 118. The signaling server 118 can be configured to establish connections between the client devices 102 and the server computer 112 for the video conference. In particular, the client devices 102 may request a video conference (e.g., from the video conferencing service 110), and the video conferencing service 110 may trigger the signaling server 118 to establish network connections between the client devices 102 and the server computer 112 (and/or other entities). Once the connections are established, the client devices 102 can send media content 120 to the video conferencing service 110 (and/or the selective forwarding unit 116) during the video conference. It should be understood that this example embodiment is illustrative, and therefore should not be construed as being limiting in any way.

During the video conference, the server computer 112 therefore can access the media content 120 (e.g., a first version of the media content 120 being sent to and/or received from the client device 102A and a second version of the media content 120 being sent to and/or received from the client device 102N). The server computer 112 also can be configured to generate and/or obtain one or more instances of quality of experience metric data 122. The quality of experience metric data 122 can represent various metrics that relate to and/or encapsulate interactivity of the client devices 102 within the video conference. In particular, as will be explained below, the quality of experience metric data 122 can represent a number of metrics that can relate to quality of experience such as turnaround time, silence time ratio, overlap time ratio, overlap rate, useful conversation time ratio, repeat rate, turn-taking freedom, and/or other metrics.

The turnaround time is one measure of client-to-client latency in a video conference. According to various embodiments of the concepts and technologies disclosed herein, the turnaround time can be measured by the conferencing optimization module 114 by accessing the media content 120 and/or other representation of the video conference stream as perceived by an observer of the conference (e.g., the video conferencing service 110). The turnaround time can reflect and/or represent an amount of time that passes from after a first client (e.g., a user associated with the client device 102A) finishes speaking until a second client (e.g., a user associated with the client device 102N) begins to respond to the speech of the first client. While the turnaround time metric can assume an orderly interaction between clients (e.g., when the first client speaks and the second client responds or replies), this is not necessarily the case in all embodiments and therefore the turnaround time may or may not be one of the metrics reflected by the quality of experience metric data 122 in all embodiments. It should be understood that this example embodiment is illustrative, and therefore should not be construed as being limiting in any way.

According to some embodiments of the concepts and technologies disclosed herein, the silence time ratio can represent and/or describe a fraction of total conversation time that is spent without any client speaking. The silence time ratio can be measured by the conferencing optimization module 114 by accessing the media content 120 and/or other representation of the video conference stream as perceived by an observer of the conference (e.g., the video conferencing service 110), and/or can be measured by one or more of the client devices 102 and provided to the server computer 112 as the quality of experience metric data 122. As turn changes in conversations may be recognized as times of silence, the silence time ratio may be lower-bounded by a sum of the turnaround times normalized by the conversation time. As the turnaround time may be dependent on latency, a higher latency can imply more time spent in silence. It should be understood that this example embodiment is illustrative, and therefore should not be construed as being limiting in any way.

According to some embodiments of the concepts and technologies disclosed herein, the overlap time ratio can represent and/or describe an ability of clients of a video conference (e.g., users of the client devices 102) to detect the presence of speech of other clients (e.g., users of other client devices 102). The overlap time ratio can be measured by the conferencing optimization module 114 by accessing the media content 120 and/or other representation of the video conference stream as perceived by an observer of the conference (e.g., the video conferencing service 110), and/or can be measured by one or more of the client devices 102 and provided to the server computer 112 as the quality of experience metric data 122. Because latency between client devices 102 may hinder the ability of one client to detect the presence of speech of the other clients, thereby increasing the risk of speaking out of turn and/or multiple clients speaking at once, the overlap time ratio can be a useful measure of quality. Namely, overlap time ratio can describe the percentage of total conversation with more than one client talking. In a typical conversation, the scenario of multiple people talking simultaneously causes inefficient communication, as no useful information can be exchanged, and thus, overlap time ratio can be understood by the conferencing optimization module 114 as a measure of the wasted time in a conversation. It should be understood that this example embodiment is illustrative, and therefore should not be construed as being limiting in any way.

According to some embodiments of the concepts and technologies disclosed herein, the overlap rate can represent and/or describe a rate at which speech overlaps during a video conference. The overlap rate can be measured by the conferencing optimization module 114 by accessing the media content 120 and/or other representation of the video conference stream as perceived by an observer of the conference (e.g., the video conferencing service 110), and/or can be measured by one or more of the client devices 102 and provided to the server computer 112 as the quality of experience metric data 122. In a conversation, repairing overlapping speech may require an action from the participants to reset the current turn, and these events can be detected in the video conference. While overlaps of speech are generally short in duration (e.g., a few syllables), such overlaps, regardless of duration, may result in some type of repair by the conference participants and therefore can result in lost time and lost quality associated with the video conference. As a result, measuring the overlap rate can provide insight into how often this scenario arises during the conversation. It should be understood that this example embodiment is illustrative, and therefore should not be construed as being limiting in any way.

According to some embodiments of the concepts and technologies disclosed herein, the useful conversation time ratio can represent and/or describe a portion, ratio, fraction, or the like, of time for useful exchange during a video conference. The useful conversation time ratio can be measured by the conferencing optimization module 114 by accessing the media content 120 and/or other representation of the video conference stream as perceived by an observer of the conference (e.g., the video conferencing service 110), and/or can be measured by one or more of the client devices 102 and provided to the server computer 112 as the quality of experience metric data 122. According to various embodiments of the concepts and technologies disclosed herein, the useful conversation time ratio can include and/or reflect several effects. In particular, the useful conversation time ratio can include the effect of longer delays between turns and a higher overlap rate due to higher latency. As a result, useful conversation time ratio and interactivity quality of experience may be closely related in some embodiments, and therefore the useful conversation time ratio may be a valuable metric for determining quality of experience. It should be understood that this example embodiment is illustrative, and therefore should not be construed as being limiting in any way.

According to some embodiments of the concepts and technologies disclosed herein, the repeat rate can represent and/or describe a likelihood that a conference participant (e.g., client) repeats a statement or word (e.g., as an attempt to repair a conversation). The repeat rate can be measured by the conferencing optimization module 114 by accessing the media content 120 and/or other representation of the video conference stream as perceived by an observer of the conference (e.g., the video conferencing service 110), and/or can be measured by one or more of the client devices 102 and provided to the server computer 112 as the quality of experience metric data 122. As video conferences between two people are relatively common and often of high importance, for example, telehealth appointments, it may also help to evaluate the repeat rate because if a conversation participant does not hear a response within an expected amount of time, the typical behavior is for another conference participant to either prompt for a response again or repeat what was said last, with either behavior leading to wasted communication time since no new information is exchanged. Adding latency between the two clients can be expected to make it more difficult for a first client to detect when the other client begins their turn. Thus, an increase in repeat rate can be expected when latency increases. This metric can be of particular importance in the two-client case given the expectation of frequent turn-taking. It should be understood that this example embodiment is illustrative, and therefore should not be construed as being limiting in any way.

According to some embodiments of the concepts and technologies disclosed herein, the turn-taking freedom can represent and/or describe an ability of each client of a video conference to take a turn speaking. The turn-taking freedom can be measured by the conferencing optimization module 114 by accessing the media content 120 and/or other representation of the video conference stream as perceived by an observer of the conference (e.g., the video conferencing service 110), and/or can be measured by one or more of the client devices 102 and provided to the server computer 112 as the quality of experience metric data 122. The turn-taking freedom can consider both the number of turns taken by each client, as well as the order in which the turns are taken. If the allocation of turns is balanced and the order is mostly random, then the turn-taking freedom can be given a high value, with low values being assigned where the allocation of turns is unbalanced, non-random, or the like. In some embodiments, a value of turn-taking freedom can be found to correspond to user satisfaction when calculated based on analyzing the media content 120 and/or other stream of content, and therefore an increase in turn-taking freedom can correspondingly increase perceived quality of experience. It should be understood that this example embodiment is illustrative, and therefore should not be construed as being limiting in any way.

The video conferencing service 110 can be configured to detect a request for a video conference. The request for the video conference can be made in a number of manners including, for example, one or more of the client devices 102 or other devices requesting the video conference, by one or more of the client devices 102 starting a video conference via interactions with the video conferencing service 110, via an application or service call sent to the video conferencing service 110 or the like. Because the request for the video conference can be detected in additional and/or alternative manners, it should be understood that these example embodiments are illustrative, and therefore should not be construed as being limiting in any way.

The video conferencing service 110 can be configured to create the video conference (e.g., to set up a virtual room for the video conference, to send invites to the video conference, or the like) and to join one or more client devices 102 to the video conference. In various embodiments, the client devices 102 can connect to the video conference via links or the like, and in some embodiments, the client devices 102 can be joined to the video conference by the signaling server 118. For example, the video conferencing service 110 can be configured to trigger setup of the conference by the signaling server 118 as explained. Thus, it can be appreciated that the video conferencing service 110 can identify the participants in the video conference and trigger creation of the video conference by the signaling server 118 in various embodiments. It should be understood that this example embodiment is illustrative, and therefore should not be construed as being limiting in any way.

The video conferencing service 110 can host the video conference as is generally understood. Thus, the client devices 102 can send media content 120 (e.g., streams of video and/or audio content) to the server computer 112, and the server computer 112 can send streams of media content 120 to the client devices 102. During the video conference, the client devices 102 also can capture the quality of experience metrics illustrated and described herein, generate quality of experience metric data 122, and send the quality of experience metric data 122 to the video conferencing service 110. In some embodiments, the video conferencing service 110 can generate the quality of experience metric data 122 based on analysis of the video conference (e.g., by analyzing the media content 120 received by and/or sent by the server computer 112 during the video conference). It should be understood that this example embodiment is illustrative, and therefore should not be construed as being limiting in any way.

The video conferencing service 110 can determine, based on analyzing the quality of experience metric data 122 (received from the client devices 102 and/or generated at the server computer 112), if the quality of experience associated with the video conference meets defined measures and/or expectations. For example, the video conferencing service 110 can store or access defined quality of experience measures for the video conference and determine, based on the quality of experience metric data 122, if the defined quality of experience measure(s) are satisfied. It can be appreciated that embodiments of the concepts and technologies disclosed herein can enable the video conferencing service 110 to project or estimate quality of experience associated with the video conference without directly analyzing or determining network conditions (e.g., latency, jitter, or the like) associated with the video conference and/or connections used in association with the video conference. Thus, the video conferencing service 110 can be configured to determine quality of experience associated with the video conference based on data that can be observable by the video conferencing service 110 (e.g., the video and/or audio stream associated with the video conference). It should be understood that this example embodiment is illustrative, and therefore should not be construed as being limiting in any way.

If the video conferencing service 110 determines that the quality of experience defined for the video conference is satisfied, the video conferencing service 110 may not make any changes to the video conference and the video conference may continue unchanged. If the video conferencing service 110 determines that the quality of experience defined for the video conference is not satisfied, the video conferencing service 110 may determine that some changes may be made to the video conference (e.g., to attempt to improve quality of experience or perceived quality of experience for the video conference). In various embodiments of the concepts and technologies disclosed herein, the video conferencing service 110 may change the video conference by adding or removing parties from the video conference; by adding delay to some devices (e.g., if one client device 102 is experiencing delay, adding delay to the other client device 102 may improve perceived quality of experience, or the like); by prioritizing some applications (e.g., the video conferencing application 108) to improve performance and/or reduce delay or jitter; by instructing one or more of the client devices 102 to alter encryption and/or decryption technologies; by instructing one or more of the client devices 102 to alter resolution of captured video; by instructing one or more of the client devices 102 to alter quality (e.g., sampling rate or the like) of captured audio; by instructing one or more of the client devices 102 and/or the signaling server 118 to switch paths, channels, servers, or other hardware associated with the video conference; combinations thereof; or the like. Because other changes can be made as illustrated and described herein, it should be understood that these example embodiments are illustrative, and therefore should not be construed as being limiting in any way.

The video conferencing service 110 can generate one or more commands 124. The commands 124 can include computer-executable instructions that, when executed by a recipient such as the client devices 102, the signaling server 118, or the like, cause the client devices 102 and/or the signaling server 118 to make changes to the video conference and/or to make changes to network technologies and/or connections used for the video conference. Thus, for example, the commands 124 can be executed by the client devices 102 and/or the signaling server 118 to add or change parties in the video conference; alter encryption and/or decryption technologies used in the video conference; alter resolution of captured video in the video conference; alter quality of audio captured during the video conference; switch paths, channels, servers, or other hardware associated with the video conference; change software used in association with the video conference; combinations thereof; or the like. Because other changes can be made as illustrated and described herein, it should be understood that these example embodiments are illustrative, and therefore should not be construed as being limiting in any way.

The video conferencing service 110 can send the commands 124 to the client devices 102 and/or the signaling server 118 (and/or implement similar actions at the server computer 112) to make the commanded changes to the video conference. The video conferencing service 110 can determine if the video conference has ended. If not, the video conferencing service 110 can again receive and/or capture the quality of experience metric data 122 again to determine if any changes should be made. Thus, it can be appreciated that the video conferencing service 110 can be configured to continually monitor quality of experience associated with the video conference via analyzing the quality of experience metric data 122 and/or analyzing the media content or other streams associated with the video conference. It should be understood that this example embodiment is illustrative, and therefore should not be construed as being limiting in any way.

In practice, a user, client, or other entity can request a video conference. For example, a client can create a request (e.g., via a portal, API, or the like) for a video conference from a video conferencing service 110, start a video conference via interactions with the video conferencing service 110, or otherwise start or request the video conference. The video conferencing service 110 can be configured to initiate the video conference (e.g., set up a virtual room for the video conference, send invites to the video conference, or the like) and join two or more client devices 102 to the video conference. In some embodiments, the video conferencing service 110 can trigger setup of the conference by communicating with the signaling server 118, and the signaling server can connect the client devices 102 to the video conference. It should be understood that this example embodiment is illustrative, and therefore should not be construed as being limiting in any way.

The video conferencing service 110 can be configured to host the video conference and to send and receive media content 120 (e.g., streams of video and/or audio content) to the client devices 102 involved in the video conference. The video conferencing service 110 or a component thereof such as the conferencing optimization module 114 can analyze the video conference (e.g., by analyzing the video and audio being sent and/or received by the video conferencing service 110) to track interactivity associated with the video conference. Based on the observed behavior of the clients and/or client devices 102 (e.g., turnaround time, silence time ratio, overlap time ratio, overlap rate, useful conversation time ratio, repeat rate, turn-taking freedom, and/or other metrics), the conferencing optimization module 114 can determine an actual, projected, and/or perceived quality of experience associated with the video conference without accessing or determining any network conditions (e.g., latency, jitter, downlink and/or uplink speed, bandwidth, combinations thereof, or the like).

In some embodiments, the client devices 102 also can be configured to capture the quality of experience metrics (e.g., by analyzing the received and/or sent media content 120 using the video conferencing application 108 and determining, based on the analysis of the media content 120, turnaround time, silence time ratio, overlap time ratio, overlap rate, useful conversation time ratio, repeat rate, turn-taking freedom, and/or other metrics). The client devices 102 can generate quality of experience metric data 122 that represent these and/or other metrics and send the quality of experience metric data 122 to the video conferencing service 110 in addition to or instead of the video conferencing service 110 generating the quality of experience metric data 122 based on analysis of the video conference. It should be understood that this example embodiment is illustrative, and therefore should not be construed as being limiting in any way.

The video conferencing service 110 can determine, based on analyzing the quality of experience metric data 122 (received from the client devices 102 and/or generated at the server computer 112), if the quality of experience associated with the video conference meets defined measures and/or expectations. For example, the video conferencing service 110 can store or access defined quality of experience measures for the video conference and determine, based on the quality of experience metric data 122, if the defined quality of experience measure(s) are satisfied. For example, a turn-around time that exceeds a particular threshold (e.g., two seconds or the like) may be understood by the conferencing optimization module 114 and/or the video conferencing service 110 as indicating a high level of latency associated with the client devices 102 and/or their connections to the video conferencing service 110, thereby indicating a relatively low quality of experience relative to defined quality of experience targets.

As such, the video conferencing service 110 can be configured to project, estimate, or determine quality of experience associated with the video conference without directly analyzing or determining network conditions (e.g., latency, jitter, uplink or downlink speed, bandwidth, utilization, or the like) associated with the video conference and/or connections used in association with the video conference. Thus, the video conferencing service 110 can be configured to determine quality of experience associated with the video conference based on data that can be observable by the video conferencing service 110 and/or the client devices 102 (e.g., the video and/or audio stream associated with the video conference) and therefore can determine the quality of experience in a more efficient and/or reliable manner than collecting and analyzing network performance data or the like. It should be understood that this example embodiment is illustrative, and therefore should not be construed as being limiting in any way.

If the video conferencing service 110 determines that the quality of experience associated with the video conference meets or exceeds some defined measures or metrics, the video conferencing service 110 may determine that no changes need to be made to the video conference, connections associated with the video conference, the client devices 102, and/or other aspects of the video conference. If the video conferencing service 110 determines that the quality of experience targets or measures defined for the video conference are not satisfied, the video conferencing service 110 may determine that some changes may be made to the video conference via changes to connection paths, prioritization, clients, or other aspects of the video conference to attempt to improve quality of experience or perceived quality of experience for the video conference.

In various embodiments of the concepts and technologies disclosed herein, the video conferencing service 110 may change the video conference by adding or removing parties from the video conference; by instructing one or more of the client devices 102 to alter encryption and/or decryption technologies used by the client devices 102; by instructing one or more of the client devices 102 to alter resolution of captured video; by instructing one or more of the client devices 102 to alter quality (e.g., sampling rate or the like) of captured audio; by instructing one or more of the client devices 102 and/or the signaling server 118 to switch paths, channels, servers, or other hardware or software associated with the video conference; to introduce delay at one or more than one client device 102 (to reduce a disparity in delay among the two or more client devices 102); combinations thereof; or the like. Because other changes can be made as illustrated and described herein, it should be understood that these example embodiments are illustrative, and therefore should not be construed as being limiting in any way.

The video conferencing service 110 can generate one or more commands 124 that can capture instructions for making the desired changes to the video conference and/or entities associated with the video conference such as the client devices 102, the communication paths, or the like. The commands 124 can include computer-executable instructions that, when executed by a recipient such as the client devices 102, the signaling server 118, or the like, can cause the client devices 102, the signaling server 118, network hardware or software, or other entities to make changes to the video conference and/or to make changes to network technologies and/or connections used for the video conference. Thus, for example, the commands 124 can be executed by the client devices 102 and/or the signaling server 118 to add or change parties in the video conference; alter encryption and/or decryption technologies used in the video conference; alter resolution of captured video in the video conference; alter quality of audio captured during the video conference; switch paths, channels, servers, or other hardware associated with the video conference; change software used in association with the video conference; change priorities associated with the applications executing on the client devices 102; introduce delay at one or more of the client devices 102; combinations thereof; or the like. Because other changes can be made as illustrated and described herein, it should be understood that these example embodiments are illustrative, and therefore should not be construed as being limiting in any way.

The video conferencing service 110 can send the commands 124 to the client devices 102, the signaling server 118, or other devices, and/or can implement similar actions at the server computer 112 itself (for example to modify operation of the video conferencing service 110, the conferencing optimization module 114, the selective forwarding unit 116, or the like) to make the commanded changes to the video conference. This analysis can continue and/or can be repeated to improve quality of experience of the video conference during the video conference itself. The video conferencing service 110 can determine at various times if the video conference has ended. If the video conference has not ended, the video conferencing service 110 can again obtain and analyze media content 120 and/or can again receive and/or capture the quality of experience metric data 122 to determine if any changes should be made. Thus, it can be appreciated that the video conferencing service 110 can be configured to continually monitor quality of experience associated with the video conference via analyzing the quality of experience metric data 122 and/or analyzing the media content 120 or other streams associated with the video conference. It should be understood that this example embodiment is illustrative, and therefore should not be construed as being limiting in any way.

According to various embodiments of the concepts and technologies disclosed herein, the video conferencing application 108 and/or the video conferencing service 110 (or other applications and/or components thereof such as the conferencing optimization module 114 and/or the selective forwarding unit 116) can measure interactivity by observing and/or using six recognized states associated with the client (e.g., a user or other entity using the client device 102). The states can be used to train machine learning and/or artificial intelligence during a simulation and/or training process. Thus, it can be appreciated that the video conferencing service 110 and/or components thereof can be configured to analyze the video/audio content using natural language analysis and/or state recognition to determine the quality of experience metrics (e.g., text associated with a conversation in a video conference can be generated and analyzed to identify repeated phrases, or the like). It should be understood that this example embodiment is illustrative, and therefore should not be construed as being limiting in any way.

For completeness, these states are defined below. As noted, these states can be used to train the video conferencing service 110 in some embodiments. It should be understood that this example embodiment is illustrative, and therefore should not be construed as being limiting in any way. These six states can include idle, hearing, thinking, speaking, awaiting, and repair. By recognizing these states (e.g., in analyzing the media content 120 and/or a video/audio stream associated with the video conference), the interactivity metrics can be determined and/or captured. Each of these states is set forth below in more detail.

The idle state can correspond to a starting state for all clients other than an initial speaker in a video conference. In the idle state, all clients other than the speaking client will be listening for when another client begins speaking. Once speech from a client is detected, the idle clients will transition to the hearing state. It should be understood that this example embodiment is illustrative, and therefore should not be construed as being limiting in any way.

The hearing state can be defined for a client hearing speech from another client. The hearing client will remain in the hearing state until the hearing client determines or detects the speaking client has stopped speaking, at which time the hearing client will returns to the idle state or the hearing client will transition to the thinking state.

The thinking state can be determined to exist if a hearing client was guided, requested, or asked to speak by a previous speaking client, or if the speaking client opened up the conversation to other thoughts or replies. When a client enters the thinking state, a think timer can begin counting down. A thinking counter can define an amount of time that will generally be used to formulate a response and can be set by configurations and/or settings (e.g., as two seconds, five seconds, ten seconds, or the like). The thinking state therefore can represent a natural thinking time that a client experiences between the hearing state and a speaking state. After the thinking counter elapses, the client may check to see if anyone else is currently speaking, and if not, go to the speaking state. If another client is or begins speaking, then the thinking client can re-enter the hearing state. It should be understood that this example embodiment is illustrative, and therefore should not be construed as being limiting in any way.

In the speaking state, a client is in the process of speaking. The speaking state can be a starting state for the initial speaker in a video conference. The speaking client can remain in the speaking state until a speak timer elapses, at which point there can be a probabilistic transition, according to which the client returns to thinking and attempts a turn continuation or transitions to the awaiting state. While in the speaking state, the client can continuously monitor the video conference to determine if another client also enters the speaking state. If this occurs, the speaking client can exit the speaking state immediately and transition to the repair state. This represents an overlap scenario. It should be understood that this example embodiment is illustrative, and therefore should not be construed as being limiting in any way.

In the awaiting state, a client is waiting for a response. The awaiting state can enable a client to continue a turn as speaker if the client does not hear a reply within a defined time. Thus, the awaiting state can also include a timer job. If the timer expires before a reply is detected, the client can return to the speaking state. If the client detects a reply while the timer job is still running (e.g., before expiration), the client can return immediately to the hearing state. It should be understood that this example embodiment is illustrative, and therefore should not be construed as being limiting in any way.

In the repair state, all clients that are speaking in parallel (e.g., an overlap scenario) can enter the repair state. Clients in the repair state can wait for one speaking party to stop speaking. Once the repair state client determines that all clients have stopped speaking, and until a retry period passes, the client can remain in repair state. After the timer elapses, the client can return to the speaking state if the client does not detect other speaking clients. Otherwise, the client can return to the hearing state.

The above states and analysis can be used to train the conferencing optimization module 114, the video conferencing service 110, and/or the selective forwarding unit 116, and these and/or other components can use the training to recognize, in the media content 120 and/or a video/audio stream associated with the video conference, the various metrics illustrated and described hereinabove. It should be understood that this example embodiment is illustrative, and therefore should not be construed as being limiting in any way.

FIG. 1 illustrates two client devices 102, one network 104, one server computer 112, and one signaling server 118. It should be understood, however, that various implementations of the operating environment 100 can include two or more than two client devices 102; one or more than one network 104; one or more than one server computer 112; and/or zero, one, or more than one signaling server 118. As such, the illustrated embodiment should be understood as being illustrative, and should not be construed as being limiting in any way.

Figure 2:
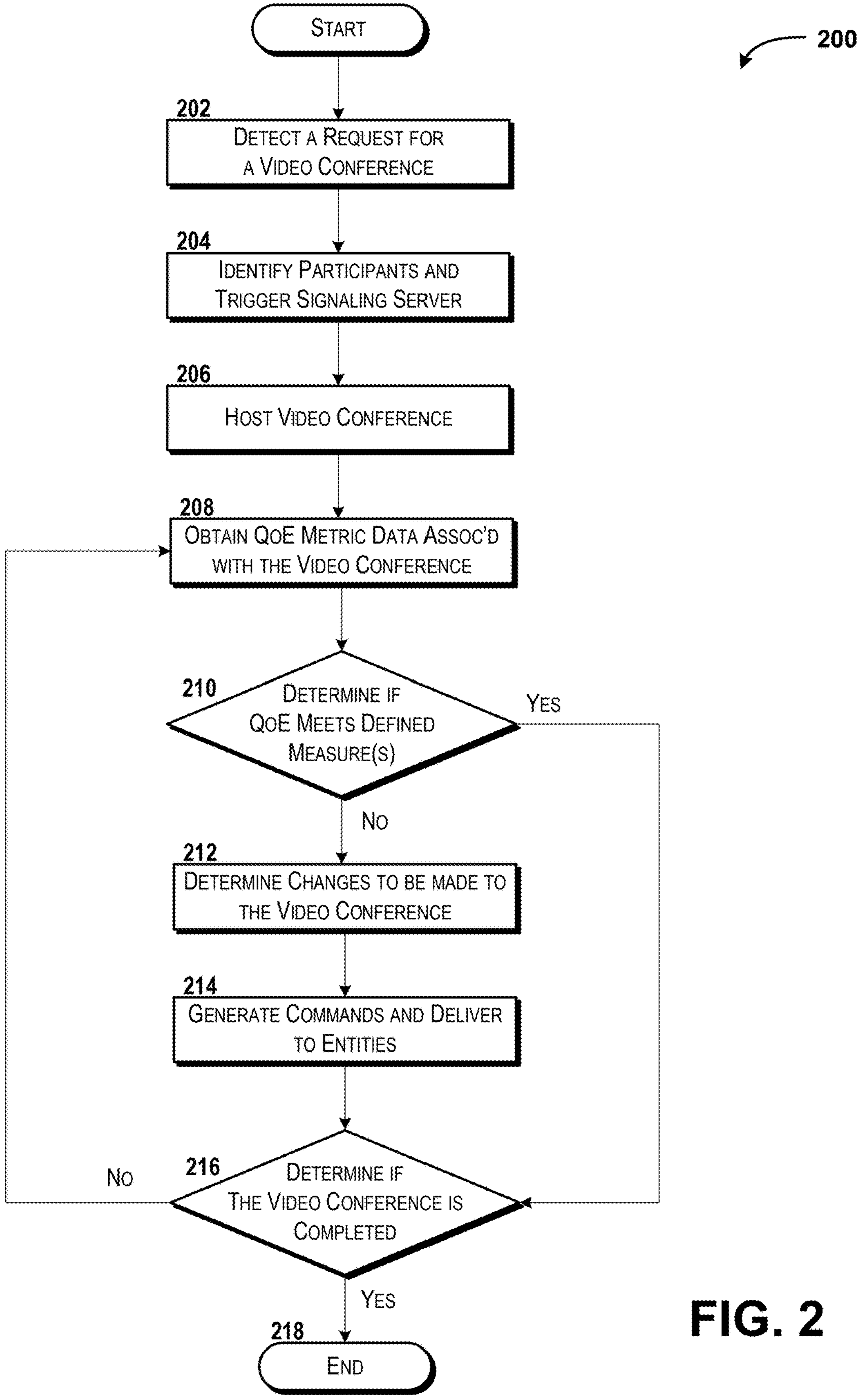
FIG. 2 is a flow diagram showing aspects of a method for measuring and using interactivity in video conferencing, according to an illustrative embodiment of the concepts and technologies described herein.

Turning now to FIG. 2, aspects of a method 200 for measuring and using interactivity in video conferencing will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as one of the client devices 102 and/or the server computer 112, to perform one or more operations and/or causing the processor to direct other components of the computing system or device to perform one or more of the operations.

For purposes of illustrating and describing the concepts of the present disclosure, the method 200 is described herein as being performed by the server computer 112 via execution of one or more software modules such as, for example, the video conferencing service 110. It should be understood that additional and/or alternative devices and/or network nodes can provide the functionality described herein via execution of one or more modules, applications, and/or other software including, but not limited to, the video conferencing service 110. Thus, the illustrated embodiments are illustrative, and should not be viewed as being limiting in any way.

The method 200 begins at operation 202. At operation 202, the server computer 112 can detect a request for a video conference. According to various embodiments, The server computer 112 can receive one or more requests for a video conference from one or more of the client devices 102 or other devices requesting the video conference, by one or more of the client devices 102 starting a video conference via interactions with the server computer 112 (e.g., via a portal, application programming interface ("API"), or the like), via an application or service call sent to the server computer 112 by the client devices 102 and/or other entities, combinations thereof, or the like. Because the request for the video conference can be detected in additional and/or alternative manners, it should be understood that these example embodiments are illustrative, and therefore should not be construed as being limiting in any way.

From operation 202, the method 200 can proceed to operation 204. At operation 204, the server computer 112 can identify one or more participants for the video conference and trigger the signaling server 118 to set up the video conference. The server computer 112 can be configured to create the video conference (e.g., to set up a virtual room or other dedicated space for the video conference, to send or trigger delivery of invites to the video conference to one or more participants, or the like). It should be understood that this example embodiment is illustrative, and therefore should not be construed as being limiting in any way.

The server computer 112 also can instruct (e.g., via commands 124, requests, or the like) the signaling server 118 to join one or more client devices 102 to the video conference. In various embodiments, the signaling server 118 can connect one or more client devices 102 to the video conference. For example, the server computer 112 can be configured to trigger setup of the conference by the signaling server 118 as explained. Thus, it can be appreciated that the server computer 112 can identify the participants in the video conference and trigger creation of the video conference by the signaling server 118 in various embodiments. It should be understood that this example embodiment is illustrative, and therefore should not be construed as being limiting in any way.

From operation 204, the method 200 can proceed to operation 206. At operation 206, the server computer 112 can host the video conference. The server computer 112 can host the video conference as is generally understood. Thus, the server computer 112 can receive streams and/or instances of media content 120 from the client devices 102, record or otherwise capture the media content 120, and send streams or instances of media content 120 to the client devices 102. It can be appreciated that in various embodiments of the concepts and technologies disclosed herein, the server computer 112 can be configured to selectively send media content 120 to the client devices 102 via the video conferencing service 110 and/or a selective forwarding unit 116 thereof. It should be understood that this example embodiment is illustrative, and therefore should not be construed as being limiting in any way.

From operation 206, the method 200 can proceed to operation 208. At operation 208, the server computer 112 can obtain quality of experience metric data 122 associated with the video conference. In some embodiments, the server computer 112 can receive the client devices 102 (which can be configured to send the quality of experience metric data 122 to the server computer 112). In some embodiments, the server computer 112 can generate the quality of experience metric data 122 based on analysis of the video conference (e.g., by analyzing the media content 120 received by and/or sent by the server computer 112 during the video conference). Because the server computer 112 can obtain the quality of experience metric data 122 in additional and/or alternative manners, it should be understood that these examples are illustrative, and therefore should not be construed as being limiting in any way.

From operation 208, the method 200 can proceed to operation 210. At operation 210, the server computer 112 can determine if the quality of experience associated with the video conference (e.g., based on analysis of the quality of experience metric data 122) meets or does not meet one or more defined quality of experience measures. In some embodiments of the concepts and technologies disclosed herein, the server computer 112 can store or access defined quality of experience measures for the video conference and determine, based on the quality of experience metric data 122 and the stored quality of experience measures, if the defined quality of experience measure(s) are satisfied.

As explained above, embodiments of the concepts and technologies disclosed herein can enable the server computer 112 to project or estimate quality of experience associated with the video conference using the quality of experience metric data 122 (received at and/or generated at the server computer 112) without directly analyzing or determining network conditions such as, for example, network latency, network jitter, network uplink and/or downlink speed, connection bandwidth, combinations thereof, or the like. Thus, embodiments of the concepts and technologies disclosed herein can enable the server computer 112 to determine quality of experience associated with the video conference based on data that can be observable by the server computer 112 (e.g., the video and/or audio stream associated with the video conference). This, of course, can allow the server computer 112 to improve quality of experience without obtaining network condition data and therefore can improve efficiency of improving quality of experience. It should be understood that this example embodiment is illustrative, and therefore should not be construed as being limiting in any way.

If the server computer 112 determines, in operation 210, that the quality of experience defined for the video conference is satisfied, the server computer 112 may elect not to make any changes to the video conference and the video conference may continue unchanged. If the server computer 112 determines, in operation 210, that the quality of experience defined for the video conference is not satisfied, the method 200 may proceed to operation 212.

In operation 212, the server computer 112 may determine what changes are to be made to the video conference (e.g., in an attempt to improve quality of experience or perceived quality of experience for the video conference). In various embodiments of the concepts and technologies disclosed herein, operation 212 can include the server computer 112 determining that changes should be made to the video conference by adding or removing parties from the video conference; by instructing one or more of the client devices 102 to alter encryption and/or decryption technologies; by instructing one or more of the client devices 102 to alter resolution of captured video; by instructing one or more of the client devices 102 to alter quality (e.g., sampling rate or the like) of captured audio; by instructing one or more of the client devices 102 and/or the signaling server 118 to switch paths, channels, servers, or other hardware associated with the video conference; combinations thereof; or the like. Because other changes can be made as illustrated and described herein, it should be understood that these example embodiments are illustrative, and therefore should not be construed as being limiting in any way.

From operation 212, the method 200 can proceed to operation 214. At operation 214, the server computer 112 can generate one or more commands 124 based on the changes determined in operation 212. Thus, in operation 214, the server computer 112 can generate commands 124 that can include computer-executable instructions that, when executed by a recipient such as the client devices 102, the signaling server 118, or the like, can cause the client devices 102 and/or the signaling server 118 or other devices to make changes to the video conference and/or to make changes to network technologies and/or connections used for the video conference. It should be understood that the changes to the video conference also can be made by the server computer 112 in some embodiments, so commands 124 may not be generated as such (but rather may be implemented by the server computer 112 without transmission of commands 124). It should be understood that this example embodiment is illustrative, and therefore should not be construed as being limiting in any way.

In some embodiments, the commands 124 generated by the server computer 112 can be executed by the client devices 102 and/or the signaling server 118 to add or change parties in the video conference; alter encryption and/or decryption technologies used in the video conference; alter resolution of captured video in the video conference; alter quality of audio captured during the video conference; switch paths, channels, servers, or other hardware associated with the video conference; change software used in association with the video conference; combinations thereof; or the like. Because other changes can be made as illustrated and described herein, it should be understood that these example embodiments are illustrative, and therefore should not be construed as being limiting in any way.

In operation 214, the server computer 112 can deliver the commands 124 to the entities identified in operation 212. Thus, the server computer 112 can send (or trigger the delivery of) the commands 124 to the client devices 102 and/or the signaling server 118 (and/or implement similar actions at the server computer 112) to make the commanded changes to the video conference. It should be understood that this example embodiment is illustrative, and therefore should not be construed as being limiting in any way.

From operation 214, the method 200 can proceed to operation 216. The method 200 can also proceed to operation 216 from operation 210 if the server computer 112 determines, in operation 210, that the quality of experience metrics do meet the one or more defined measures. At operation 216, the server computer 112 can determine if the video conference (requested in operation 202) has been completed. If the server computer 112 determines, in operation 216, that the video conference has not been completed, the method 200 can return to operation 208 and the server computer 112 can again obtain the quality of experience metric data 122. Operations 208-216 can be iterated until the server computer 112 determines, in any iteration of operation 216, that the video conference has been completed.

If the server computer 112 determines, in operation 216, that the video conference has been completed, the method 200 can proceed to operation 218. The method 200 can end at operation 218.

Figure 3:
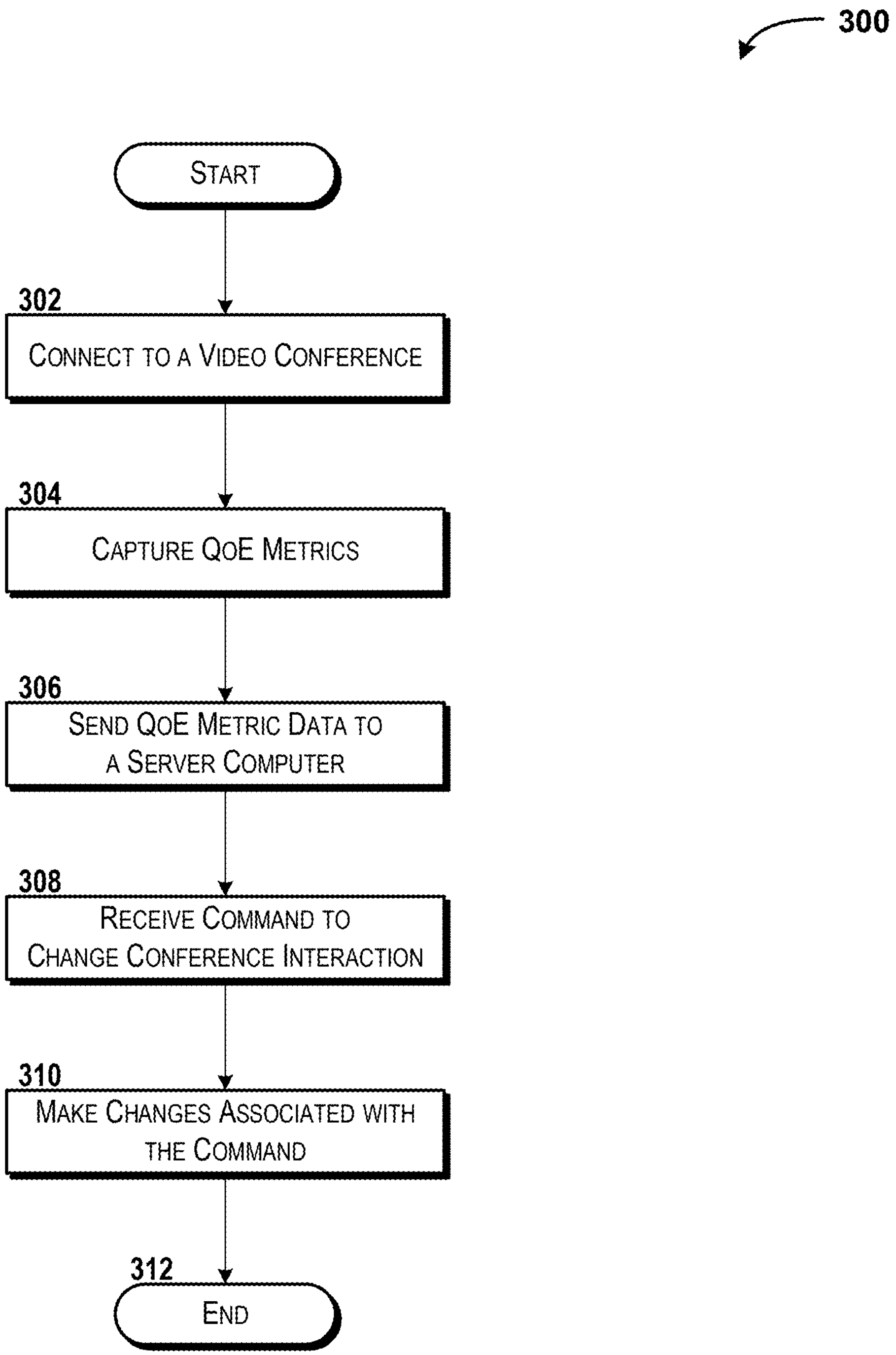
FIG. 3 is a flow diagram showing aspects of a method for measuring and using interactivity in video conferencing, according to another illustrative embodiment of the concepts and technologies described herein.

Turning now to FIG. 3, aspects of a method 300 for measuring and using interactivity in video conferencing will be described in detail, according to an illustrative embodiment. For purposes of illustrating and describing the concepts of the present disclosure, the method 300 is described herein as being performed by the client device 102 via execution of one or more software modules such as, for example, the video conferencing application 108. It should be understood that additional and/or alternative devices and/or network nodes can provide the functionality described herein via execution of one or more modules, applications, and/or other software including, but not limited to, the video conferencing application 108. Thus, the illustrated embodiments are illustrative, and should not be viewed as being limiting in any way.

The method 300 begins at operation 302. At operation 302, the client device 102 can connect to a video conference. According to various embodiments of the concepts and technologies disclosed herein, the client devices 102 can join the video conference in various ways. For example, one or more client devices 102 can connect to the video conference via accessing or executing links or the like. In some other embodiments, the client devices 102 can join the video conference at the command of and/or by communicating with the signaling server 118. Because the client device 102 can connect to the video conference in additional and/or alternative manners, it should be understood that the above examples are illustrative, and therefore should not be construed as being limiting in any way.

From operation 302, the method 300 can proceed to operation 304. At operation 304, the client device 102 can capture one or more quality of experience metrics (e.g., the quality of experience metric data 122). According to some embodiments of the concepts and technologies disclosed herein, the client device 102 may capture some quality of experience metric data 122 such as, for example, the turnaround time associated with the client device 102 in the video conference, the silence time ratio associated with the client device 102 in the video conference, the overlap time ratio associated with the client device 102 in the video conference, the overlap rate associated with the client device 102 in the video conference, the useful conversation time ratio associated with the client device 102 in the video conference, the repeat rate associated with the client device 102 in the video conference, and the turn-taking freedom associated with the client device 102 in the video conference. It should be understood that this example embodiment is illustrative, and therefore should not be construed as being limiting in any way.

From operation 304, the method 300 can proceed to operation 306. At operation 306, the client device 102 can send the quality of experience metric data 122 to the server computer 112. In some embodiments, the client device 102 can generate the quality of experience metric data 122 based on analysis of the video conference (e.g., by analyzing the media content 120 received by and/or sent by the client device 102 during the video conference). Because the quality of experience metric data 122 can be generated by the client device 102 in additional and/or alternative manners, it should be understood that this example is illustrative, and therefore should not be construed as being limiting in any way.

From operation 306, the method 300 can proceed to operation 308. At operation 308, the client device 102 can receive a command 124 to change video conference interactions. As explained above, the command 124 received in operation 308 can cause the client device 102 to make changes to the video conference (and the commands 124 can be sent to other entities such as the signaling server 118 to make changes as well). Thus, the commands 124 received in operation 308 may instruct the client device 102 to change a path associated with the video conference (e.g., to connect via other paths, servers, or the like); to change software associated with the video conference; to change encryption and/or decryption technologies used for the video conference; and/or to make other changes as illustrated and described herein.

From operation 308, the method 300 can proceed to operation 310. At operation 310, the client device 102 can make the changes associated with the command 124 received in operation 310. Thus, in operation 310 the client device 102 may change a path associated with the video conference (e.g., to connect via other paths, servers, or the like); change software associated with the video conference; change encryption and/or decryption technologies used for the video conference; and/or to make other changes as illustrated and described herein. Because the client device 102 may work in conjunction with the server computer 112 and/or the signaling server 118 to make some changes to the video conference, it should be understood that these example embodiments are illustrative, and therefore should not be construed as being limiting in any way.

From operation 310, the method 300 can proceed to operation 312. The method 300 can end at operation 312.

Figure 4:
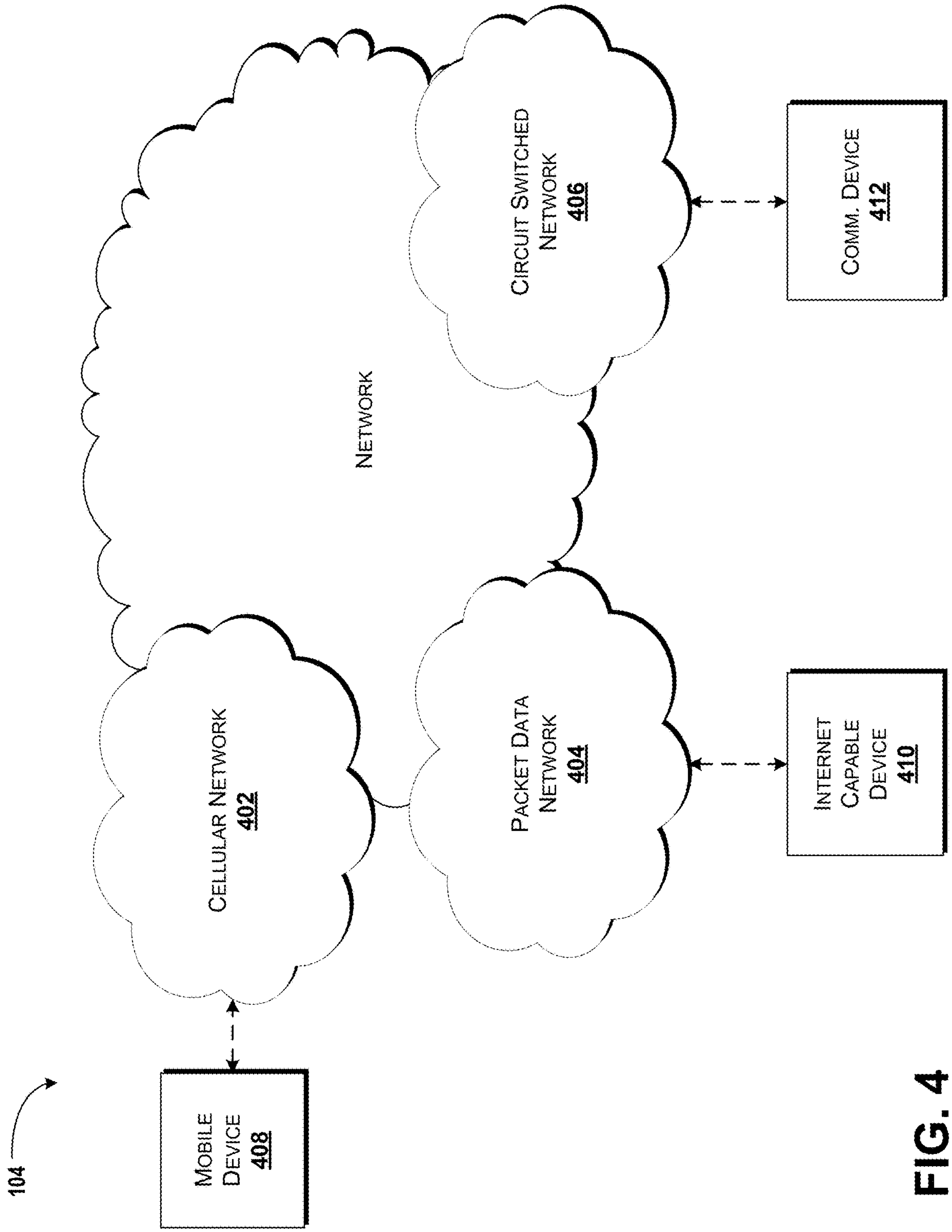
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), NodeB's or eNodeB's ("eNBs"), gNodeBs ("gNBs"), or the like; base station controllers ("BSCs") radio network controllers ("RNCs"), or the like; an evolved packet core ("EPC"); mobile switching centers ("MSCs" or "MSSs"); session management functions ("SMFs); mobile management entities ("MMEs"); access and mobility management functions ("AMFs); authentication server functions ("AUSFs"), network slice selection functions ("NSSFs); network exposure functions ("NEFs"); policy control functions ("PCFs"); and various other functions in the user and control planes such as, for example, user plane functions ("UPFs), application functions ("AFs"), NF repository functions ("NRFs"), and the like; short message service centers ("SMSCs"); multimedia messaging service centers ("MMSCs"); home location registers ("HLRs"); home subscriber servers ("HSSs"); visitor location registers ("VLRs"); charging platforms; billing platforms; voicemail platforms; GPRS core network components; links to data networks ("DNs") and/or other operator services, third party services, and/or the Internet; location service nodes, an IP Multimedia Subsystem ("IMS"); and the like. Of course, the cellular network 402 also can include various interfaces between various components, as is generally understood. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards, 5G mobile communications standards, 6G mobile communication standards, other mobile communications standards, and evolved and future mobile communications standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
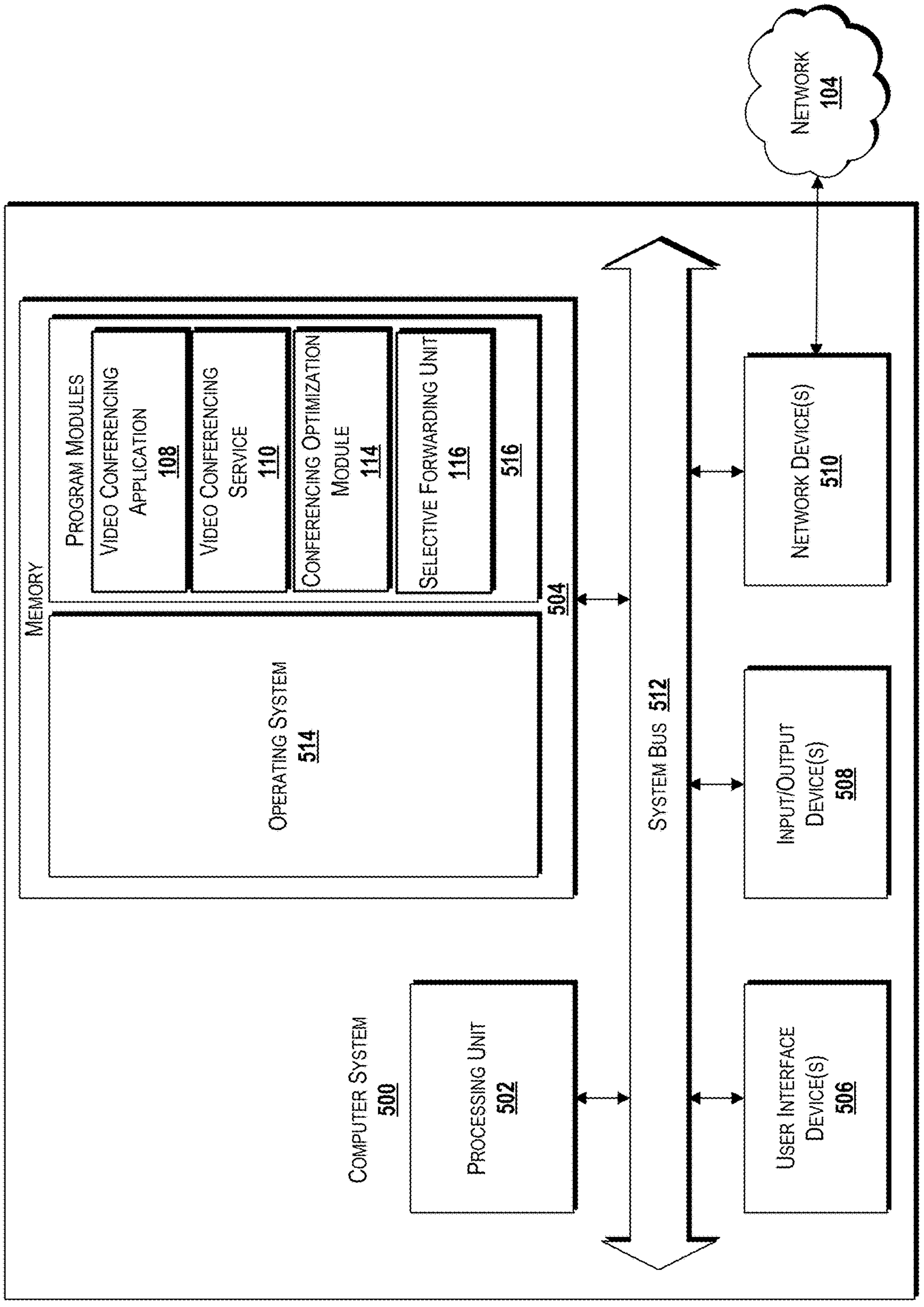
FIG. 5 is a block diagram illustrating an example computer system configured to measure and use interactivity in video conferencing, according to some illustrative embodiments of the concepts and technologies described herein.

FIG. 5 is a block diagram illustrating a computer system 500 configured to provide the functionality described herein for measuring and using interactivity in video conferencing, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The system bus 512 can enable bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or SONOMA families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the video conferencing application 108, the server computer 112, the conferencing optimization module 114, and/or the selective forwarding unit 116. These and/or other programs can be embodied in computer-readable media containing instructions that, when executed by the processing unit 502, perform one or more of the methods 200 and 300 described in detail above with respect to FIGS. 2-3 and/or other functionality as illustrated and described herein. It can be appreciated that, at least by virtue of the instructions embodying the methods 200, 300, and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the media content 120, the quality of experience metric data 122, the commands 124, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
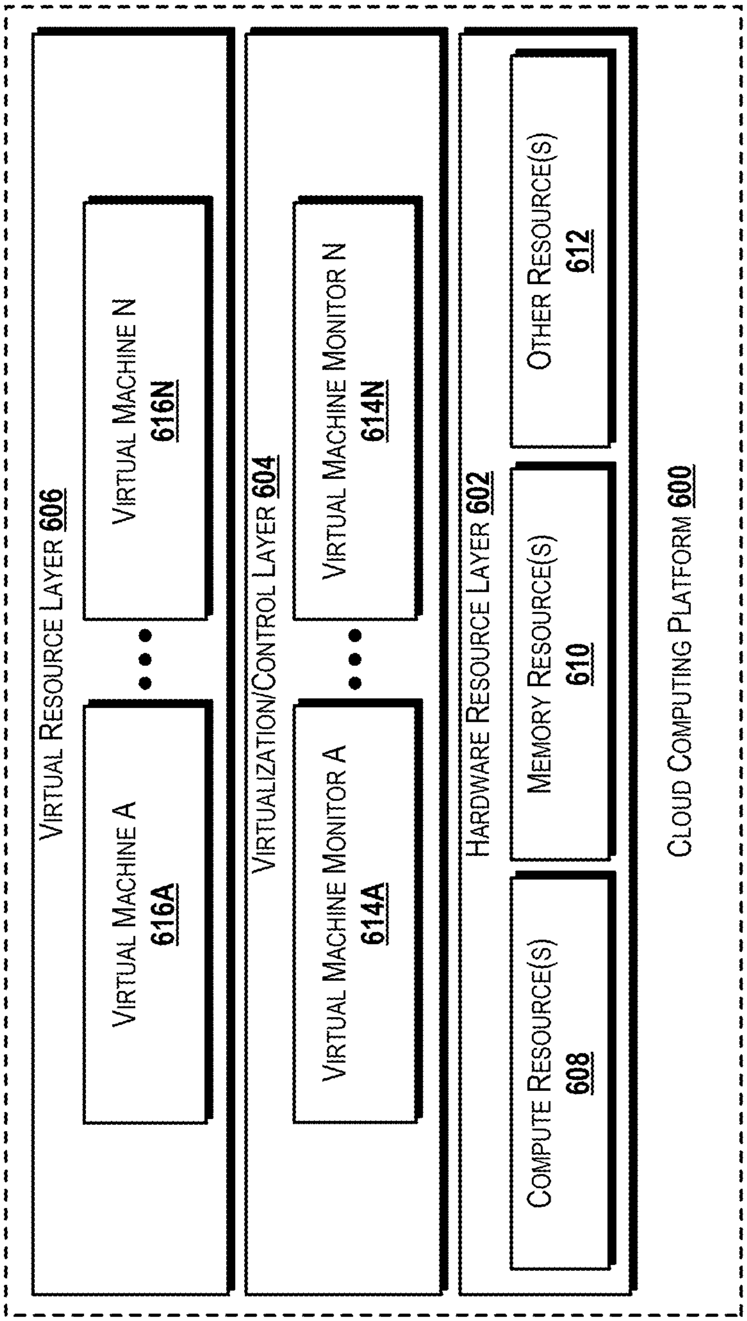
FIG. 6 is a diagram illustrating a computing environment capable of implementing aspects of the concepts and technologies disclosed herein, according to some illustrative embodiments of the concepts and technologies described herein.

FIG. 6 illustrates an illustrative architecture for a cloud computing platform 600 that can be capable of executing the software components described herein for measuring and using interactivity in video conferencing and/or for interacting with the video conferencing application 108, the server computer 112, the conferencing optimization module 114, and/or the selective forwarding unit 116. Thus, it can be appreciated that in some embodiments of the concepts and technologies disclosed herein, the cloud computing platform 600 illustrated in FIG. 6 can be used to provide the functionality described herein with respect to the client devices 102, the server computer 112, and/or the signaling server 118.

The cloud computing platform 600 thus may be utilized to execute any aspects of the software components presented herein. Thus, according to various embodiments of the concepts and technologies disclosed herein, the video conferencing application 108, the server computer 112, the conferencing optimization module 114, and/or the selective forwarding unit 116 can be implemented, at least in part, on or by elements included in the cloud computing platform 600 illustrated and described herein. Those skilled in the art will appreciate that the illustrated cloud computing platform 600 is a simplification of but only one possible implementation of an illustrative cloud computing platform, and as such, the illustrated cloud computing platform 600 should not be construed as being limiting in any way.

In the illustrated embodiment, the cloud computing platform 600 can include a hardware resource layer 602, a virtualization/control layer 604, and a virtual resource layer 606. These layers and/or other layers can be configured to cooperate with each other and/or other elements of a cloud computing platform 600 to perform operations as will be described in detail herein. While connections are shown between some of the components illustrated in FIG. 6, it should be understood that some, none, or all of the components illustrated in FIG. 6 can be configured to interact with one another to carry out various functions described herein. In some embodiments, the components are arranged so as to communicate via one or more networks such as, for example, the network 104 illustrated and described hereinabove (not shown in FIG. 6). Thus, it should be understood that FIG. 6 and the following description are intended to provide a general understanding of a suitable environment in which various aspects of embodiments can be implemented, and should not be construed as being limiting in any way.

The hardware resource layer 602 can provide hardware resources. In the illustrated embodiment, the hardware resources can include one or more compute resources 608, one or more memory resources 610, and one or more other resources 612. The compute resource(s) 608 can include one or more hardware components that can perform computations to process data, and/or to execute computer-executable instructions of one or more application programs, operating systems, services, and/or other software including, but not limited to, the video conferencing application 108, the server computer 112, the conferencing optimization module 114, and/or the selective forwarding unit 116 illustrated and described herein.

According to various embodiments, the compute resources 608 can include one or more central processing units ("CPUs"). The CPUs can be configured with one or more processing cores. In some embodiments, the compute resources 608 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 608 can include one or more discrete GPUs. In some other embodiments, the compute resources 608 can include one or more CPU and/or GPU components that can be configured in accordance with a co-processing CPU/GPU computing model. Thus, it can be appreciated that in some embodiments of the compute resources 608, a sequential part of an application can execute on a CPU and a computationally-intensive part of the application can be accelerated by the GPU. It should be understood that this example is illustrative, and therefore should not be construed as being limiting in any way.

In some embodiments, the compute resources 608 also can include one or more system on a chip ("SoC") components. It should be understood that an SoC component can operate in association with one or more other components as illustrated and described herein, for example, one or more of the memory resources 610 and/or one or more of the other resources 612. In some embodiments in which an SoC component is included, the compute resources 608 can be or can include one or more embodiments of the SNAPDRAGON brand family of SoCs, available from QUALCOMM of San Diego, California; one or more embodiment of the TEGRA brand family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 608 can be or can include one or more hardware components arranged in accordance with an ARM architecture, available for license from ARM HOLDINGS of Cambridge, United Kingdom. Alternatively, the compute resources 608 can be or can include one or more hardware components arranged in accordance with an x86 architecture, such as an architecture available from INTEL CORPORATION of Mountain View, California, and others.

Those skilled in the art will appreciate the implementation of the compute resources 608 can utilize various computation architectures and/or processing architectures. As such, the various example embodiments of the compute resources 608 as mentioned hereinabove should not be construed as being limiting in any way. Rather, implementations of embodiments of the concepts and technologies disclosed herein can be implemented using compute resources 608 having any of the particular computation architecture and/or combination of computation architectures mentioned herein as well as other architectures.

Although not separately illustrated in FIG. 6, it should be understood that the compute resources 608 illustrated and described herein can host and/or execute various services, applications, portals, and/or other functionality illustrated and described herein. Thus, the compute resources 608 can host and/or can execute the video conferencing application 108, the server computer 112, the conferencing optimization module 114, and/or the selective forwarding unit 116 or other applications or services illustrated and described herein.

The memory resource(s) 610 can include one or more hardware components that can perform or provide storage operations, including temporary and/or permanent storage operations. In some embodiments, the memory resource(s) 610 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 608, subject to the definition of "computer storage media" provided above (e.g., as excluding waves and signals per se and/or communication media as defined in this application).

Although not illustrated in FIG. 6, it should be understood that the memory resources 610 can host or store the various data illustrated and described herein including, but not limited to, the media content 120, the quality of experience metric data 122, the commands 124, and/or other data, if desired. It should be understood that this example is illustrative, and therefore should not be construed as being limiting in any way.

The other resource(s) 612 can include any other hardware resources that can be utilized by the compute resources(s) 608 and/or the memory resource(s) 610 to perform operations. The other resource(s) 612 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 602 can be virtualized by one or more virtual machine monitors ("VMMs") 614A-614N (also known as "hypervisors;" hereinafter "VMMs 614"). The VMMs 614 can operate within the virtualization/control layer 604 to manage one or more virtual resources that can reside in the virtual resource layer 606. The VMMs 614 can be or can include software, firmware, and/or hardware that alone or in combination with other software, firmware, and/or hardware, can manage one or more virtual resources operating within the virtual resource layer 606.

The virtual resources operating within the virtual resource layer 606 can include abstractions of at least a portion of the compute resources 608, the memory resources 610, the other resources 612, or any combination thereof. These abstractions are referred to herein as virtual machines ("VMs"). In the illustrated embodiment, the virtual resource layer 606 includes VMs 616A-616N (hereinafter "VMs 616").

Based on the foregoing, it should be appreciated that systems and methods for measuring and using interactivity in video conferencing have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A system comprising a processor and a memory that stores computer-executable instructions that, when executed by the processor, cause the processor to perform operations comprising:

detecting a request to initiate a video conference;

identifying two client devices that are to be added to the video conference;

triggering a signaling server to establish the video conference with the two client devices, wherein the two client devices generate, exchange, and receive media content with one another via a video conferencing service;

obtaining, at a computer, quality of experience metric data associated with the video conference, wherein the quality of experience metric data defines an interactivity associated with the video conference and is based on observable behavior associated with the video conference, wherein the quality of experience metric data is generated at the computer by analyzing an audio and video stream associated with the video conference by detecting repeated phrases, overlapping speech, and a silence time ratio using machine learning that is trained on simulated video conferences;

determining, based on the quality of experience metric data, if a projected quality of experience associated with the video conference satisfies a defined quality of experience measure; and if a determination is made that the projected quality of experience associated with the video conference does not satisfy the defined quality of experience measure, determining a change to be made to the video conference to improve the projected quality of experience, generating a command that, when executed, causes a recipient to make the change, and sending the command to the recipient.

2. The system of claim 1, wherein the quality of experience metric data comprises data representing a turnaround time, an overlap time ratio, an overlap rate, a useful conversation time ratio, a repeat rate, and turn-taking freedom associated with the video conference.

3. The system of claim 2, wherein a first portion of the quality of experience metric data is generated by the computer by analyzing the audio and video stream associated with the video conference, and wherein a second portion of the quality of experience metric data is provided to the computer by the two client devices.

4. The system of claim 3, wherein the two client devices generate the quality of experience metric data based on analyzing the media content received by the two client devices.

5. The system of claim 1, wherein the quality of experience metric data is provided to the computer by the two client devices, and wherein the two client devices generate the quality of experience metric data based on analyzing the media content received by the two client devices.

6. The system of claim 1, wherein the command causes one client device of the two client devices to introduce delay into audio and video associated with the video conference at the one client device.

7. The system of claim 1, wherein the command causes the two client devices to reconnect to the video conference using a different communication path.

8. A method comprising:

detecting, at a computer comprising a processor, a request to initiate a video conference;

identifying, by the processor, two client devices that are to be added to the video conference;

triggering, by the processor, a signaling server to establish the video conference with the two client devices, wherein the two client devices generate, exchange, and receive media content with one another via a video conferencing service;

obtaining, by the processor, quality of experience metric data associated with the video conference, wherein the quality of experience metric data defines an interactivity associated with the video conference and is based on observable behavior associated with the video conference, wherein the quality of experience metric data is generated at the computer by analyzing an audio and video stream associated with the video conference by detecting repeated phrases, overlapping speech, and a silence time ratio using machine learning that is trained on simulated video conferences;

determining, by the processor and based on the quality of experience metric data, if a projected quality of experience associated with the video conference satisfies a defined quality of experience measure; and if a determination is made that the projected quality of experience associated with the video conference does not satisfy the defined quality of experience measure, determining, by the processor, a change to be made to the video conference to improve the projected quality of experience, generating, by the processor, a command that, when executed, causes a recipient to make the change, and sending, by the processor, the command to the recipient.

9. The method of claim 8, wherein the quality of experience metric data comprises data representing a turnaround time, an overlap time ratio, an overlap rate, a useful conversation time ratio, a repeat rate, and turn-taking freedom associated with the video conference.

10. The method of claim 9, wherein a first portion of the quality of experience metric data is generated by the computer by analyzing the audio and video stream associated with the video conference, and wherein a second portion of the quality of experience metric data is provided to the computer by the two client devices.

11. The method of claim 10, wherein the two client devices generate the quality of experience metric data based on analyzing the media content received by the two client devices.

12. The method of claim 8, wherein the quality of experience metric data is provided to the computer by the two client devices, and wherein the two client devices generate the quality of experience metric data based on analyzing the media content received by the two client devices.

13. The method of claim 8, wherein the command causes one client device of the two client devices to introduce delay into audio and video associated with the video conference at the one client device.

14. A computer storage medium having computer-executable instructions stored thereon that, when executed by a processor, cause the processor to perform operations comprising:

detecting a request to initiate a video conference;

identifying two client devices that are to be added to the video conference;

triggering a signaling server to establish the video conference with the two client devices, wherein the two client devices generate, exchange, and receive media content with one another via a video conferencing service;

obtaining, at a computer, quality of experience metric data associated with the video conference, wherein the quality of experience metric data defines an interactivity associated with the video conference and is based on observable behavior associated with the video conference, wherein the quality of experience metric data is generated at the computer by analyzing an audio and video stream associated with the video conference by detecting repeated phrases, overlapping speech, and a silence time ratio using machine learning that is trained on simulated video conferences;

determining, based on the quality of experience metric data, if a projected quality of experience associated with the video conference satisfies a defined quality of experience measure; and if a determination is made that the projected quality of experience associated with the video conference does not satisfy the defined quality of experience measure, determining a change to be made to the video conference to improve the projected quality of experience, generating a command that, when executed, causes a recipient to make the change, and sending the command to the recipient.

15. The computer storage medium of claim 14, wherein the quality of experience metric data comprises data representing a turnaround time, an overlap time ratio, an overlap rate, a useful conversation time ratio, a repeat rate, and turn-taking freedom associated with the video conference.

16. The computer storage medium of claim 15, wherein a first portion of the quality of experience metric data is generated by the computer by analyzing the audio and video stream associated with the video conference, and wherein a second portion of the quality of experience metric data is provided to the computer by the two client devices.

17. The computer storage medium of claim 16, wherein the two client devices generate the quality of experience metric data based on analyzing the media content received by the two client devices.

18. The computer storage medium of claim 14, wherein the quality of experience metric data is provided to the computer by the two client devices, and wherein the two client devices generate the quality of experience metric data based on analyzing the media content received by the two client devices.

19. The computer storage medium of claim 14, wherein the command causes one client device of the two client devices to introduce delay into audio and video associated with the video conference at the one client device.

20. The computer storage medium of claim 14, wherein the command causes the two client devices to reconnect to the video conference using a different communication path.

* * * * *